(12) United States Patent
Jennek et al.

(10) Patent No.: US 9,079,591 B2
(45) Date of Patent: Jul. 14, 2015

(54) ACTUATOR FOR A BRAKE SYSTEM OF A RAIL VEHICLE

(75) Inventors: Steffen Jennek, Neuried (DE); Toni Schiffers, Erkelenz (DE); Manfred Wiesand, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 73 days.

(21) Appl. No.: 14/006,753

(22) PCT Filed: Mar. 21, 2012

(86) PCT No.: PCT/EP2012/054996
§ 371 (c)(1),
(2), (4) Date: Oct. 11, 2013

(87) PCT Pub. No.: WO2012/126946
PCT Pub. Date: Sep. 27, 2012

(65) Prior Publication Data
US 2014/0046514 A1 Feb. 13, 2014

(30) Foreign Application Priority Data
Mar. 23, 2011 (DE) .......................... 10 2011 006 002

(51) Int. Cl.
| B61L 3/00 | (2006.01) |
| B61H 13/00 | (2006.01) |
| B60T 7/04 | (2006.01) |
| B60T 7/08 | (2006.01) |
| B60T 8/17 | (2006.01) |
| B60T 17/22 | (2006.01) |

(52) U.S. Cl.
CPC ............... *B61H 13/00* (2013.01); *B60T 7/042* (2013.01); *B60T 7/085* (2013.01); *B60T 8/1705* (2013.01); *B60T 17/228* (2013.01)

(58) Field of Classification Search
None
See application file for complete search history.

(56) References Cited

U.S. PATENT DOCUMENTS

| 5,050,940 | A | * | 9/1991 | Bedford et al. ............... 303/166 |
| 6,669,308 | B1 | * | 12/2003 | Aurich et al. .................. 303/15 |
| 7,055,660 | B2 | * | 6/2006 | Friesen ......................... 188/265 |
| 2010/0292875 | A1 | | 11/2010 | Gross | |

FOREIGN PATENT DOCUMENTS

| DE | 19510755 A1 | 10/1996 |
| DE | 19539652 A1 | 4/1997 |

(Continued)

*Primary Examiner* — John R Olszewski
*Assistant Examiner* — James M McPherson
(74) *Attorney, Agent, or Firm* — Laurence A. Greenberg; Werner H. Stemer; Ralph E. Locher

(57) ABSTRACT

An actuator for a brake system of a rail vehicle has a set-value detection unit that outputs a set value or a set value corrected by a reducing signal of an anti-skid control device for a decelerating force or a decelerating torque to a set-value control device. The latter controls the set value to a first output set value. A switch-over device connects an output of the set-value control device to a input of a set-value/force conversion device in a first switching position. In a second switching position, the set-value/force conversion device receives the signal from a fall-back unit. Braking devices convert an actual value of the force into an actual value of the decelerating force or decelerating torque. When impermissible deviations from a fast braking set value in a fast-braking operation are found, the switch-over device switches from the first to the second switching position.

5 Claims, 1 Drawing Sheet

(56) References Cited

FOREIGN PATENT DOCUMENTS

| DE | 10106377 | A1 | 7/2002 |
|---|---|---|---|
| DE | 10106374 | A1 | 9/2002 |
| DE | 102006011963 | B3 | 8/2007 |
| RU | 102336 | U1 | 2/2011 |
| SU | 977240 | A1 | 11/1982 |
| WO | 0024625 | A2 | 5/2000 |

* cited by examiner

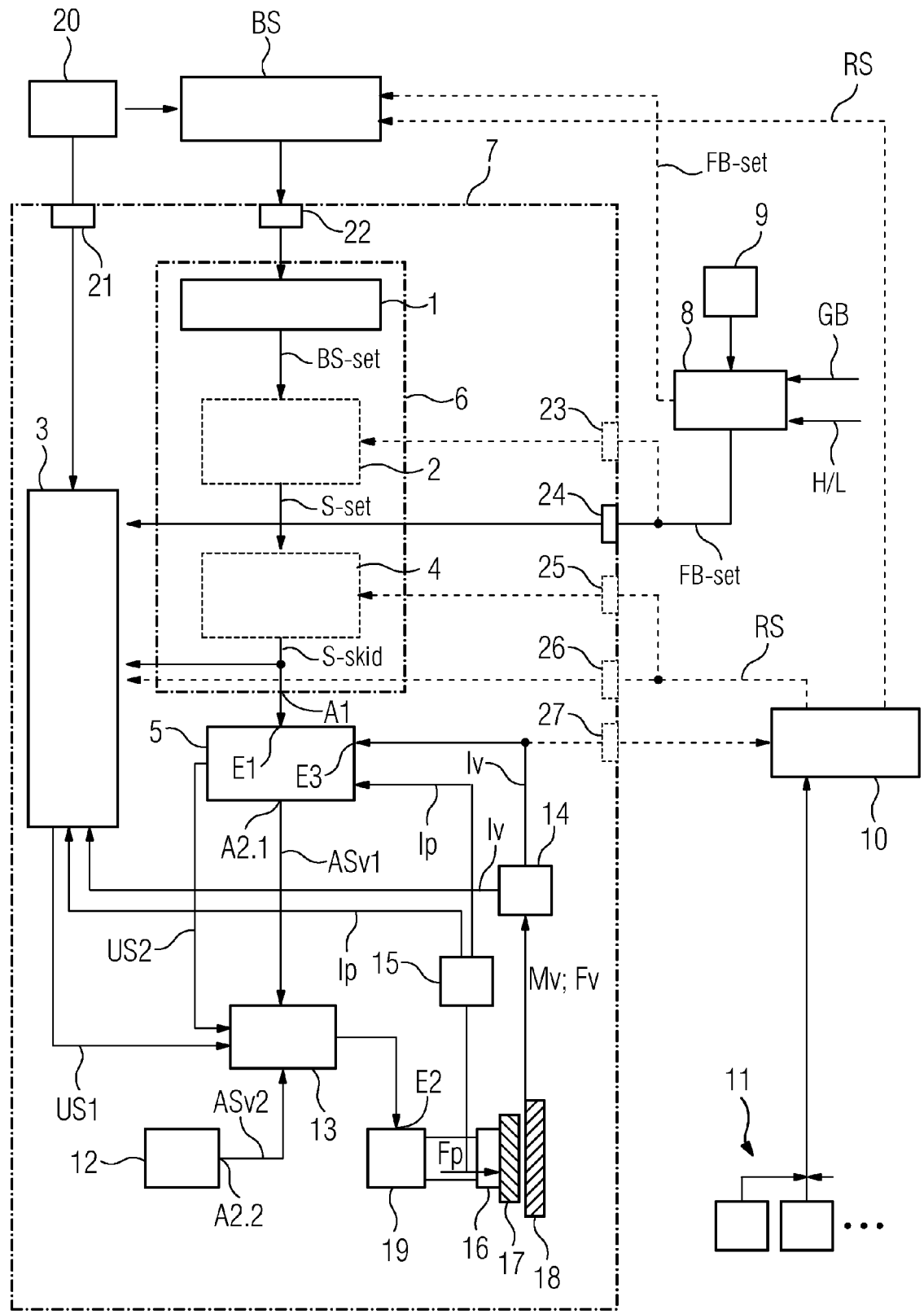

though the invention relates to an actuator for a brake system of a rail vehicle.

ACTUATOR FOR A BRAKE SYSTEM OF A RAIL VEHICLE

BACKGROUND OF THE INVENTION

Field of the Invention

The invention relates to an actuator for a brake system of a rail vehicle.

Furthermore the invention relates to a brake system for braking a rail vehicle with such an actuator arranged in its entirety for assembly in a bogie of the rail vehicle. In addition, the invention relates to a rail vehicle with several wagons, which are linked to each other to form a group of vehicles, which has such a brake system.

The approval of rail vehicles places high demands on the braking equipment of the vehicles.

The testing of the brake system takes place within the framework of approval of rail vehicles in accordance with national and international regulations and laws. In these extensive tests, the braking power of the brakes is ascertained by means of a mandatory method, the so-called "brake assessment". This braking power is assigned to the vehicle as so-called "brake-weight". The brake-weight is used e.g. to ascertain the maximum velocity at which this vehicle may travel and how fast it may travel on particular routes. For rail vehicles which operate in inner-city areas, such as subways or streetcars, other approval procedures apply to the brakes, but these vehicles also have friction brakes.

The brake-weight is ascertained by means of dynamic braking distance measurements and braking tests.

As a rule, rail vehicles have several brake systems which are used in the various brake positions. The brake systems include, in particular, friction brakes embodied as block and/or disk brakes, electrodynamic brakes using an electromotor, retarder brakes for diesel-powered vehicles, magnetic rail brakes and eddy current brakes.

Brake assessment takes place from fixed speeds through to the intended maximum velocity of the rail vehicle in brake positions R, P, G, R+Mg, R+E. The aforementioned friction brakes work in all the brake positions, the power of the friction brakes being withheld in the brake position R+E and the power of the wear-free electrodynamic brakes being used primarily.

Within the framework of brake assessment and determination of the eligible brake-weight, narrow tolerances apply to the distribution of the measured braking distances from the same respective initial velocities. Furthermore, certain framework conditions and ambient conditions must be observed in order for the tests to be deemed valid.

In addition, via the TSI there is another breakdown of the braking power measured on the vehicle by means of the braking power ascertained on the test bench under wet conditions.

Furthermore, for all braking the maximum permissible adhesion values between wheel and rail may not be exceeded.

When using contemporary friction brakes, for example, this frequently results in numerous braking distance tests and adjustments of the brake settings being necessary during the brake assessment or the brake assessment leading to a result which produces a value which is not contractually compliant for the rail vehicle. Subsequently, adjustments are necessary and the brake assessment has to be repeated. Often compromises also have to be made in brake adjustment in order to offset individual but decisive poor braking performance under specific test conditions. The reason for this problem is mainly to be found in the friction coefficient between the friction partners of the friction brakes. This friction coefficient is not constant but dependent on velocity, pressure, temperature, power and current status of the friction partners. In order to obtain brake approval, high standards are therefore also set for the quality of the brake linings and brake blocks, resulting in high development costs and expensive materials.

In addition, today it is not possible or only at great expense to exchange a lining or block or a lining material or block material and replace it with another kind of lining or block from the same or from a second manufacturer. This gives the approved manufacturer a certain monopoly position.

Where deviations are too high during the tests, until now the problem has been solved by the required braking power only being obtained by means of corrections to the brake adjustment, increasing the test outlay and requiring repeat tests. Often the braking power is also increased at low velocities by increasing the pressure so that the required values can be obtained for a higher velocity and performance range. Furthermore, the test results in brake assessments today only represent a snapshot. Operationally the braking power is dependent on the existing friction coefficient level. Furthermore, present friction coefficient peaks are not corrected and currently result in increased wheel set loading and, depending on the track condition, in the triggering of anti-skid protection. Owing to the high costs, as a rule the approval of a second type of lining or the subsequent replacement of the lining type once it has been approved is foregone today.

Friction brakes controlled by decelerating force are known from the publications WO 2008/031701 A1 and DE102006044022.

Furthermore, brake systems with intelligent actuators are known from the German patent application with the application reference number 10 2009 042 965.4.

In addition, friction brakes and braking equipment for the secure braking of rail vehicles are known from the publications EP1347910B1 and DE102004041672.

The publication DE102004041672 describes an emergency brake device and a method for monitoring the emergency brake function as an improvement of the prior art. Whether the brake control system has taken the right measures for emergency braking is monitored here. If this is not the case, the emergency brake device takes the necessary measures. The consideration of the anti-skid protection intervention is also described. According to this patent specification, this allows decentralized, electronically controlled brake units also to be used with load correction, anti-skid protection and jerk limitation for emergency, automatic and fast braking.

The publication EP1347910B1 describes an electromechanical tensioning device with which it is also possible to brake using anti-skid protection control and/or load correction in the case of safety or fast braking.

BRIEF SUMMARY OF THE INVENTION

The object of the invention is to provide an actuator with decelerating force control which when used in a friction brake system of a rail vehicle ensures the eligibility of the (therefore decelerating force-controlled) friction brake system.

This object is achieved by an actuator for a brake system of a rail vehicle
  comprising a set value detection unit and a set value control device,
  wherein the set value detection unit provides, at an output, a set value or a set value corrected under the influence of a reducing signal of an anti-skid protection control device for a decelerating force to be controlled or a decelerating torque to be controlled and transmits said set value to an input of the set value control device, and wherein the set value control device controls the set value transmitted by the set value detection unit to a first output set value, comprising a fall-back unit, which provides a pre-defined second output set value, comprising a set value/force conversion device, comprising a switch-over device, which connects an output of the set value control device to an input of the set value/force conversion device in a first switching position so that the first output set value is present at the input of the set value/force conversion device, and which connects an output of the fall-back unit to the input of the set value/force conversion device in a second switching position so that the second output set value is present at the input of the set value/force conversion device, wherein the set value/force conversion device converts the output set value of the two output set values present at the input of the set value/force conversion device into an actual value of a force for braking the rail vehicle, comprising braking means, which convert the actual value of the force into an actual value of the decelerating force to be controlled or of the decelerating torque to be controlled, comprising a sensor, which determines the actual value of the decelerating force to be controlled or of the decelerating torque to be controlled and provides said actual value at an input of the set value control device, wherein the set value control device sets the first output set value in such a way that the detected actual value corresponds to the set value transmitted to the set value control unit by the set value detection unit, and comprising a monitoring unit, which receives a fast braking set value or at least one correction factor (fK-load, fK-H/L, fK-GB) for calculating the fast braking set value (FB-set) from a fast braking set value determination device in the event of a fast braking operation, receives the actual value from the sensor and outputs a switch-over signal to the switch-over device in the event of impermissible deviations of the actual value from the fast braking set value (FB-set), which switch-over signal causes the switch-over device to switch over from the first switching position thereof to the second switching position thereof.

It is considered to be advantageous if in the event of impermissible deviations of the actual value from the fast braking set value, the set value control device outputs an additional switch-over signal to the switch-over device, which switch-over signal causes the switch-over device to switch over from the first switching position thereof to the second switching position thereof.

In a preferred embodiment the pre-defined second output set value provided by the fall-back unit is pre-defined so that under nominal friction coefficient conditions a higher equivalent decelerating force is obtained in the second switching position of the switch-over device than in the first switching position. As per DIN EN 14531-6, by the equivalent decelerating force $a_e$ the expert understands the deceleration averaged over a route within a certain speed range. It is based on a calculation using fully established braking force. Nominal friction coefficient conditions here describe the design friction coefficient or the design friction coefficient profile in accordance with the friction coefficient of widespread compressed air friction brakes using pressure control in standard gauge railways usual today according to the prior art.

According to the invention, the following is proposed in particular:

In order to significantly reduce the costs and expenses arising as a result of the aforementioned problems and to obtain increased braking distance safety under various operating conditions, it is proposed to equip rail vehicles with an eligible friction brake system controlled by decelerating force.

In this document, controlled by decelerating force means that a set value is requested for the individual friction brakes or groups of friction brakes, wherein a friction brake comprises a friction combination, e.g. a brake disk and brake linings acting thereon, as a set value of a brake torque (decelerating torque) or as a set value of a decelerating force of a superior control system, as a rule of the brake control system, and is adjusted in the set value detection unit as a function of the fast braking set value provided by the fast braking set value determination device or in addition, under the influence of the reducing signal of the anti-skid protection control device, wherein the corrected set value of the friction brakes provided at the output of the set value detection unit is converted, wherein the control to the corrected set value of each friction brake or of each group of friction brakes is performed independently of the other friction brakes.

If groups of friction brakes are controlled to a decelerating force then not all the advantages listed below are present. If the group comprises the friction brakes of an axle or a wheel set, then advantages similar to those with decelerating force control of each individual friction brake are obtained.

Apart from the use of friction brakes controlled by decelerating force, brake assessment can also be simplified via deceleration control of the rail vehicle.

By this means, a braking distance independent of a lining or block friction coefficient (brake block corresponds to brake shoe) can likewise be obtained. However, as a result the braking power of the individual brakes is not precisely determined as today.

Therefore, deceleration control of the rail vehicle can be used to monitor the required braking power of the entire rail vehicle.

In the case of decelerating force-controlled friction brakes, the decelerating force obtained by the individual friction brakes is controlled in the brake radius and consequently via the geometric ratios the decelerating force on the wheel as well. As a result, unlike contemporary brakes controlled by compressive or contact pressing force, this friction brake is operationally independent of the friction coefficient between the friction partners. 'Operationally' is taken to mean the friction coefficient fluctuations around the nominal friction coefficient to be expected during operation.

The rail vehicle according to the invention with eligible decelerating force-controlled friction brakes exhibits the following features in particular:

In all the brake positions with involvement of the friction brakes (disk brakes and/or block brakes), the friction brakes are also included in safety-related braking, safety braking, emergency braking or fast braking, wherein the braking is characterized in that at least in relation to the friction brakes it is performed using decelerating force control and, if necessary, in addition using load correction or anti-skid protection correction.

Naturally, for this purpose the rail vehicle with this brake system must meet the known safety requirements for the braking equipment and the eligible brake systems.

For the sake of completeness, in addition it must be made clear that in principle decelerating force control, and here in particular when it is used in eligible friction brake systems, entails advantages that mean that the decelerating force control of friction brakes not considered here such as drum brakes or magnetic rail brakes may also be advisable. However, the former are not widespread in rail vehicles today and the latter are frequently used on account of the independence of the wheel/rail adhesion value.

The eligibility of the electrodynamic brake, the eddy current brake or the retarder brake as wear-free decelerating force-controlled brake systems has the additional advantage that the use of wear-prone friction brakes can be largely avoided.

An exemplary embodiment of a rail vehicle with eligible decelerating force-controlled friction brakes is described below on the basis of the FIGURE.

BRIEF DESCRIPTION OF THE SEVERAL VIEWS OF THE DRAWING

The FIGURE is a schematic diagram of a brake control system of a rail vehicle.

DETAILED DESCRIPTION OF THE INVENTION

According to the FIGURE, a rail vehicle not shown here has a vehicle and/or brake control system. Via the brake control system BS shown here the brake actuation system, here subsequently referred to as the actuator 7, receives a brake command which is transmitted via one or more control circuits and/or BUS and/or via radio to the actuation system.

Each axle of the rail vehicle is usually equipped with one actuator 7 so that as a rule an individual wagon has at least four of these actuators 7. Only one actuator 7 is exemplified here.

In an emergency, safety or fast braking instance, hereinafter referred to as a fast braking instance, each actuator 7 additionally receives a signal for fast braking via fast braking activation 20, for example, via a so-called fast braking loop, which as a rule is Low Active in design.

This means that the actuator 7 in the fast braking instance receives the signal for fast braking via the brake control system BS and at the same time via fast braking activation 20. As aforementioned, braking in the fast braking instance is also characterized in that at least in relation to the friction brakes it is performed using decelerating force control and if necessary, in addition, load correction or anti-skid protection correction, wherein for the individual friction brakes or groups of friction brakes a set value BS-set of a brake torque (decelerating torque) or a decelerating force is requested by a superior control system—here the brake control system BS.

The set value BS-set, which the actuator 7 receives from the brake control system BS, corresponds in the fast braking instance to the fast braking set value and in the operational braking instance to the operational braking set value. The set value BS-set is a brake torque (decelerating torque) My or a decelerating force Fv and is not to be equated with the brake lining or brake block contact pressing force Fp required at present. In the case of contemporary pneumatic brakes, Fp is generated by the cylinder pressure "C pressure" or via a spring which first creates the decelerating force via multiplication by the lining or block friction coefficient.

The set value BS-set, which is recorded by the set value detection device 1 in the actuator 7 is optionally already load-corrected, already optionally takes into consideration high/low deceleration H/L and optionally the so-called GB act signal GB. Furthermore, the set value BS-set is already optionally corrected for anti-skid protection.

Consideration of H/L, GB and load correction can optionally also take place in the actuator 7 via a first set value correction device 2 and/or validation can be performed in the first set value correction device 2.

Set value correction in the first set value correction device 2 increases, limits or reduces the set value BS-set as a function of an additional input signal, the so-called fast braking set value signal FB-set, created by a fast braking set value determination device 8. Alternatively, instead of the fast braking set value signal FB-set, correction factors fK-load and/or fK-H/L and/or fK-GB can serve to correct set values which are created by the fast braking set value determination device 8.

The fast braking set value signal FB-set is transmitted by the fast braking set value determination device 8 to the actuator 7 via one or more control circuits and/or via a bus and/or via radio. With regard to load detection in the fast braking set value determination device 8, the fast braking set value signal FB-set is formed from at least one sensor signal of the load sensor device 9, which detects the mass of the vehicle to be braked fully or proportionally.

The fast braking set value determination device 8 generates the fast braking set value signal FB-set as described above as a function of the detected mass of the vehicle and optionally also as a function of additional input variables, such as for example, the GB act signal GB and/or high/low deceleration H/L. Both these control variables are used in a known way in conventional pneumatic brake systems to reduce the set braking force as a function of the velocity of the vehicle (high/low deceleration H/L) and the braking power of the electrodynamic brake (GB act signal GB).

Alternatively, the fast braking set value determination device 8 ascertains the correction factor fK-load as a function of the detected mass from the sensor signal of the load sensor device 9, the correction factor fK-H/L from the H/L signal and the correction factor fK-GB from the GB signal. The correction factors fK-load, fK-H/L, fK-GB are transmitted to the actuator 7 via one or more control circuits and/or via a bus and/or via radio.

In a second set value correction device 4 the reducing signal RS can optionally be taken into account by an anti-skid protection control device 10 (anti-locking protection device) in order to be able also to implement anti-skid protection correction in the actuator 7 and/or to be able to implement validation in the second set value correction device 4.

Optionally the measured torques M can also be taken into account by the anti-skid protection control device 10 in order to optimize anti-skid protection.

When the set value correction for anti-skid protection is integrated into the actuator 7 by means of the second set value correction device 4, a set value S-set from the first set value correction device 2, which—as aforementioned—is created by a set value correction of the set value BS-set, is influenced as a function of the reducing signal RS. The reducing signal is created by the anti-skid protection control device 10 and transmitted via one or more control circuits and/or via a bus and/or via radio to the actuator 7. The anti-skid protection control device 10 records the speed of the wheels via wheel speed sensors 11 and limits the maximum wheel slip via the reducing signal RS.

According to the invention the decelerating torque (brake torque) Mv or the decelerating force Fv can be the control variable which is controlled via a set value control device 5. The control variable is set by a set value/force conversion device 19 (set value converter) via actuator force or lining contact pressing force Fp.

The design of the set value/force conversion device (set value converter) 19 generating the force Fp can be pneumatic, mechanical, electrical, hydraulic or a combination of these means of actuation. The decelerating torque Mv or the decelerating force Fv is generated with a rotating brake disk 18 via the friction coefficient between lining (brake lining) 17 and brake disk 18 (or brake block and wheel).

The set value control device 5 reads in the signals from a sensor 14 and optionally from a sensor 15.

The known geometric ratios are used to control the decelerating force at the wheel directly via the control of the decelerating force Fv or the decelerating torque Mv at the brake. Consequently, the deceleration and the braking distance in the settable range are independent of the lining friction coefficient.

In a particularly advantageous manner, to offset friction coefficient fluctuations the maximum lining contact pressing force Fp which can be generated is set more than 10% higher than the maximum lining contact pressing force necessary under nominal friction coefficient conditions for an equivalent deceleration for fast braking.

On account of the safety required in the fast braking instance, monitoring of fast braking takes place via a monitoring device 3 in the actuator 7.

The monitoring device 3 examines whether fast braking is implemented and the most recently saved fast braking set value FB-set corresponds to the actual value Iv of the decelerating force Fv to be controlled or the decelerating torque Mv to be controlled. For this purpose, in addition to the fast braking set value FB-set or alternatively in addition to at least one of the correction factors fK-load, fK-H/L and fK-GB for the creation of the fast braking set value FB-set, the monitoring device 3 obtains the measured values Iv (actual values of the brake torque Mv or the decelerating force Fv) and optionally Ip (actual values of the lining contact pressing force Fp) and optionally the anti-skid protection-corrected set value Sskid from the second set value adjustment device 4.

In a first embodiment the monitoring device 3 therefore already obtains the fast braking set value FB-set calculated in the fast braking set value determination device 8 from the fast braking set value determination device 8.

In the aforementioned alternative embodiment, in which the monitoring device 3 obtains the correction factors fK-load, fK-H/L, fK-GB from the fast braking set value determination device 8, the fast braking set value FB-set is created by the monitoring device 3 itself, based on the correction factor fK-load and/or the correction factor fK-H/L and/or the correction factor fK-GB and based on a fast braking characteristic FB-limit. For this purpose, the monitoring device 3 requests from the brake control system BS the fast braking characteristic FB-limit saved there.

The monitoring device 3 compares the measured value Iv, the fast braking set value FB-set and the anti-skid protection-corrected set value Sskid.

In other words, according to the invention an actuator is provided for a brake system of a rail vehicle. This actuator is provided:

with the set value detection unit 6 and the set value control device 5, wherein the set value detection unit 6 provides, at an output A1, the set value S-set or the set value Sskid corrected under the influence of the reducing signal RS of the anti-skid protection control device 10 for the decelerating force Fv to be controlled or the decelerating torque My to be controlled and transmits said set value to an input E1 of the set value control device 5, and wherein the set value control device 5 controls the set value Sset, optionally Sskid, transmitted by the set value detection unit 6 to a first output set value ASvl, with a fall-back unit 12, which provides a pre-defined second output set value ASv2, with a set value/force conversion device 19, with a switch-over device 13, which connects an output A2.1 of the set value control device 5 to an input E2 of the set value/force conversion device 19 in a first switching position so that the first output set value ASvl is present at the input E2 of the set value/force conversion device 19, and which connects an output A2.2 of the fall-back unit 12 to the input E2 of the set value/force conversion device 19 in a second switching position so that the second output set value ASv2 is present at the input E2 of the set value/force conversion device 19, wherein the set value/force conversion device 19 converts the output set value of the two output set values present at its input E2 into an actual value Ip of the force Fp for braking the rail vehicle, with braking means in the form of a lever mechanism with a contact pressure bracket designated as a whole as 16, a contact pressure part configured here as a brake lining 17 and the brake disk 18, which convert the actual value Ip of the force Fp into an actual value Iv of the deceleration force Fv to be controlled or of the deceleration torque Mv to be controlled, with the sensor 14, which determines the actual value Iv of the decelerating force Fv to be controlled or of the decelerating torque Mv to be controlled and provides said actual value at an input E3 of the set value control device 5, wherein the set value control device 5 sets the first output set value ASvl in such a way that the detected actual value Iv corresponds to the set value (Sset, optionally Sskid) transmitted to the set value control device 5 by the set value detection unit 6, and with the monitoring unit 3, which receives the fast braking set value FB-set or at least one correction factor (fK-load, fK-H/L, fK-GB) for calculating the fast braking set value (FB-set) from the fast braking set value determination device and receives the actual value Iv from the sensor 14 in the event of a fast braking operation and outputs a switch-over signal US1 to the switch-over device 13 in the event of impermissible deviations of the actual value Iv from the fast braking set value FB-set, which switch-over signal causes the switch-over device 13 to switch over from the first switching position thereof to the second switching position thereof.

Furthermore, the set value control device 5 also outputs an additional switch-over signal US2 to the switch-over device 13 in the event of pre-defined impermissible deviations of the actual value Iv from the fast braking set value FB-set, which switch-over signal causes the switch-over device 13 to switch over from the first switching position thereof to the second switching position thereof.

Such an impermissible deviation exists if the measured value Iv deviates from the set value FB-set by a value dMv; dFv for a period dt.

Optionally provision may also be made for an impermissible deviation which leads to a switch-over if the measured value Iv deviates from the set value Sskid by a value dMv; dFv for a period dt.

The switch-over signal US1 and also the switch-over signal US2 result in a passive fast braking force being set via a force set value generation device of the fall-back unit (fall-back level) in the switch-over device 13.

With the aforementioned exemplary architecture the safety requirements for fast braking can be met, as a result of which the conditions are present for the approval of the inventive rail vehicle with eligible decelerating force-controlled friction brakes.

With regard to the requirements for the passive fall-back level, according to the invention it is proposed to determine the necessary passive fast braking force via bench tests and to verify it via static tests on the vehicle. According to the invention the passive fast braking force should be set so that a higher equivalent (average) decelerating force or a higher equivalent (average) decelerating torque is obtained with it than with the controlled brake. If necessary, depending on the requirements of the respective regulatory authorities and/or the operator for the passive fall-back level, evidence of the passive fall-back level must still optionally be provided by means of braking tests.

The FIGURE shows interfaces 21 to 27 of the actuator 7. However, it must be added that not all the interfaces between the vehicle control system or brake control system BS and actuator 7 are shown in the FIGURE for purposes of greater clarity. In particular, the following should be mentioned here: power supply, brake-released loop or the wired connection for electrical emergency release.

A rail vehicle with an eligible decelerating force-controlled friction brake system offers the following advantages, among others:

Brake assessment and consequently also approval can take place with significantly greater ease and with greater operating safety as the braking distances are almost constant regardless of the lining or block friction coefficient, i.e. the requisite braking distances are observed even in the case of unfavorable high or low lining or block friction coefficients, e.g. caused by moisture or temperature.

Increased braking distance safety during the daily operation of the rail vehicle under various operating conditions.

Possibility of detecting an unintentionally jammed or applied brake.

Fewer anti-skid protection interventions and less risk of wheel flats as a result of decelerating force control. Lining or block friction coefficients that increase in the course of braking do not result in an increased braking force at the wheel or therefore in an increased adhesion value requirement either.

More effective anti-skid protection by means of high dynamics and by means of the direct measurement of the decelerating force or the decelerating torque.

Even distribution of the braking energy over all the brakes of a control circuit and therefore also a longer service life for brake disks and brake linings.

Defined predictable loading on the wheel set and consequently greater safety in the design of the wheel sets.

Simple changing of lining type possible without adjustment of the software or hardware in the brake system.

Simplified approval of the rail vehicle when changing the lining or block type.

The requirements for friction coefficient characteristics are much less stringent, enabling brake lining development expenditure and brake lining costs to be reduced. Lining development can be optimized with regard to lining life and disk life and consequently results in reduced LCC costs. This naturally also applies to the brake shoes or blocks.

In summary: The invention relates to an actuator (7) for a brake system of a rail vehicle —comprising a set-value detection unit (6) and a set-value control device (5), —wherein the set-value detection unit (6) provides, at an output (A1), a set value (SSoll) or a set value (SGleit) corrected under the influence of a reducing signal (RS) of an anti-skid control device (10) for a decelerating force (Fv) to be controlled or a decelerating torque (Mv) to be controlled and transmits said set value to an input (E1) of the set-value control device (5), and —wherein the set-value control device (5) controls the set value (SSoll; SGleit) transmitted by the set-value detection unit (6) to a first output set value (ASv1), —comprising a fall-back unit (12), which provides a pre-defined second output set value (ASv2), —comprising a set-value/force conversion device (19), —comprising a switch-over device (13), which connects an output (A2.1) of the set-value control device (5) to a input (E2) of the set-value/force conversion device (19) in a first switching position so that the first output set value (ASv1) is present at the input (E2) of the set-value/force conversion device (19), and which connects an output (A2.2) of the fall-back unit (12) to the input (E2) of the set-value/force conversion device (19) in a second switching position so that the second output set value (ASv2) is present at the input (E2) of the set-value/force conversion device (19), —wherein the set-value/force conversion device (19) converts the output set value of the two output set values present at the input (E2) of the set-value/force conversion device into an actual value (Ip) of a force (Fp) for braking the rail vehicle, —comprising braking means (16, 17, 18), which convert the actual value (Ip) of the force (Fp) into an actual value (Iv) of the decelerating force (FV) to be controlled or of the decelerating torque (Mv) to be controlled, —comprising a sensor (14), which determines the actual value (Iv) of the decelerating force (Fv) to be controlled or of the decelerating torque (Mv) to be controlled and provides said actual value at an input (E3) of the set-value control device (5), —wherein the set-value control device (5) sets the first output set value (ASv1) in such a way that the detected actual value (Iv) corresponds to the set value (SSoll; SGleit) transmitted to the set-value control unit (5) by the set-value detection unit (6), and —comprising a monitoring unit (3), which receives a fast braking set value (SB-Soll) or at least one correction factor (fK-Last, fK-H/N, fK-GB) for calculating the fast braking set value (SB-Soll) from a fast braking set-value determination device (8) in the event of a fast braking operation, receives the actual value (Iv) from the sensor (14) and outputs a switch-over signal (US1) to the switch-over device (13) in the event of impermissible deviations of the actual value (Iv) from the fast braking set value (SB-Soll), which switch-over signal causes the switch-over device (13) to switch over from the first switching position thereof to the second switching position thereof.

LIST OF REFERENCE CHARACTERS

1 Set value detection device
2 Set value correction device
3 Monitoring device
4 Set value correction device anti-skid protection
5 Set value control device
6 Set value detection unit
7 Actuator, brake activation system
8 Fast braking set value determination device
9 Load sensor device
10 Anti-skid protection control device
11 Wheel speed sensors
12 Fall-back unit (fall-back level) with force set value generation device
13 Switch-over device for switching to fall-back level
14 Sensor (decelerating torque detection unit, torque sensor)
15 Sensor (force detection unit/force sensor)
16 Lever mechanism with contact pressure bracket
17 Contact pressure part (brake lining)

18 Brake disk
19 Set value/force conversion device (set value converter)
20 Fast brake activation (for example, fast brake loop)
21 to 27 Actuator interfaces
AI Output of the set value detection unit
E1, E3 Inputs of the set value control device
A2.1 Output of the set value control device
A2.2 Output of fall-back unit
E2 Input of the set value/force conversion device

The invention claimed is:

1. An actuator for a brake system of a rail vehicle, the actuator comprising:
 a set value detection unit and a set value control device;
 said set value detection unit having an output carrying a set value or a set value adjusted under an influence of a reducing signal of an anti-skid protection control device for a decelerating force to be controlled or a decelerating torque to be controlled, said set value detection unit transmitting the set value to an input of said set value control device;
 said set value control device closed-loop controlling the set value received from said set value detection unit to a first output set value;
 a fall-back unit configured to provide a pre-defined second output set value;
 a set value/force conversion device having an input;
 a switch-over device connecting an output of said set value control device to said input of said set value/force conversion device in a first switching position so that the first output set value is present at said input of said set value/force conversion device, and connecting an output of said fall-back unit to said input of said set value/force conversion device in a second switching position so that the second output set value is present at said input of said set value/force conversion device;
 said set value/force conversion device converting the output set value of the two output set values present at said input thereof into an actual value of a force for braking the rail vehicle;
 braking devices configured to convert the actual value of the force into an actual value of the decelerating force to be controlled or of the decelerating torque to be controlled;
 a sensor disposed to determine the actual value of the decelerating force or of the decelerating torque and to provide the actual value at an input of said set value control device;
 said set value control device setting the first output set value such that the detected actual value corresponds to the set value transmitted from said set value detection unit to said set value control unit; and
 a monitoring unit configured to receive a fast braking set value or at least one correction factor for calculating the fast braking set value from a fast braking set value determination device in the event of a fast braking operation, to receive the actual value from the sensor, and to output a switch-over signal to said switch-over device in the event of impermissible deviations of the actual value from the fast braking set value, the switch-over signal causing the switch-over device to switch over from the first switching position thereof to the second switching position thereof.

2. The actuator according to claim 1, wherein, in the event of impermissible deviations of the actual value from the fast braking set value, said set value control device is configured to output an additional switch-over signal to said switch-over device, the switch-over signal causing said switch-over device to switch over from the first switching position thereof to the second switching position thereof.

3. The actuator according to claim 1, wherein the pre-defined second output set value provided by said fall-back unit is pre-defined such that under nominal friction coefficient conditions a relatively higher equivalent decelerating force is achieved in the second switching position of said switch-over device than in the first switching position.

4. A brake system for braking a rail vehicle, comprising:
 the actuator according to claim 1, said actuator being configured, in an entirety thereof, for assembly in a bogie of the rail vehicle.

5. A rail vehicle, comprising:
 a plurality of rail cars linked together to form a group of vehicles, each of said rail cars having at least one bogie; and
 a brake system for braking the rail vehicle, said brake system having an actuator according to claim 1 mounted in an entirety thereof, in a bogie of each of said rail cars.

* * * * *